(12) United States Patent
Shea et al.

(10) Patent No.: US 11,059,097 B2
(45) Date of Patent: *Jul. 13, 2021

(54) ADDITIVE MANUFACTURING BUILD PLATES AND HANDLING

(71) Applicant: Delavan Inc., West Des Moines, IA (US)

(72) Inventors: Lukas Shea, Carlisle, IA (US); Joseph Samo, Johnston, IA (US)

(73) Assignee: Delavan Inc., West Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,945

(22) Filed: Nov. 19, 2019

(65) Prior Publication Data

US 2020/0086384 A1  Mar. 19, 2020

Related U.S. Application Data

(62) Division of application No. 16/031,845, filed on Jul. 10, 2018, now Pat. No. 10,493,526, which is a division of application No. 15/151,115, filed on May 10, 2016, now Pat. No. 10,029,307.

(51) Int. Cl.
*B33Y 30/00* (2015.01)
*B33Y 40/00* (2020.01)
*B22F 3/00* (2021.01)
*B22F 3/105* (2006.01)
*B29C 64/245* (2017.01)
(Continued)

(52) U.S. Cl.
CPC .............. *B22F 3/005* (2013.01); *B22F 12/00* (2021.01); *B29C 64/245* (2017.08); *B22F 10/10* (2021.01); *B33Y 30/00* (2014.12); *B33Y 40/00* (2014.12); *Y02P 10/25* (2015.11)

(58) Field of Classification Search
CPC ...... B29C 64/245; B22F 3/005; B22F 3/1055; B22F 2003/1056; B22F 12/00; B33Y 30/00; B33Y 40/00; Y02P 10/25
See application file for complete search history.

(56) References Cited

U.S. PATENT DOCUMENTS

| 2,161,629 A | 6/1939 | McCord |
| 5,863,087 A | 1/1999 | Swartz |
| 6,367,791 B1 | 4/2002 | Calderon et al. |

(Continued)

FOREIGN PATENT DOCUMENTS

| CN | 203622963 U | 6/2014 |
| CN | 205395194 U | 7/2016 |

(Continued)

OTHER PUBLICATIONS

Search Report issued in Great Britain Patent Application No. GB 1707481.6, dated Aug. 11, 2017.

*Primary Examiner* — Dean J Kramer
(74) *Attorney, Agent, or Firm* — Locke Lord LLP; Scott D. Wofsy; Joshua L. Jones

(57) ABSTRACT

An additive manufacturing build plate system includes a plate body defining a build surface and a rear surface opposite the build surface. A peripheral surface extends between the rear surface and the build surface. At least one gripping feature is defined in the peripheral surface, extending inwardly into the plate body between the build surface and the rear surface.

3 Claims, 4 Drawing Sheets

(51) Int. Cl.
*B22F 12/00* (2021.01)
*B22F 10/10* (2021.01)

(56) References Cited

U.S. PATENT DOCUMENTS

| | | |
|---|---|---|
| 10,029,307 B2 | 7/2018 | Shea et al. |
| 10,493,526 B2 * | 12/2019 | Shea .................... B22F 3/1055 |
| 2012/0111238 A1 | 5/2012 | Frankenberg |
| 2015/0202687 A1 | 7/2015 | Pialot et al. |
| 2016/0059308 A1 | 3/2016 | Volk |

FOREIGN PATENT DOCUMENTS

| | | |
|---|---|---|
| EP | 1769900 A2 | 4/2007 |
| EP | 1769902 A2 | 4/2007 |
| EP | 1769904 A2 | 4/2007 |

* cited by examiner

ADDITIVE MANUFACTURING BUILD PLATES AND HANDLING

CROSS-REFERENCE TO RELATED APPLICATIONS

This application is a divisional of U.S. patent application Ser. No. 16/031,845 filed Jul. 10, 2018, granted as U.S. Pat. No. 10,493,526 which is a divisional of U.S. patent application Ser. No. 15/151,115 filed May 10, 2016, granted as U.S. Pat. No. 10,029,307 the entire contents of which are incorporated by reference herein.

BACKGROUND OF THE INVENTION

1. Field of the Invention

The present disclosure relates to additive manufacturing, and more particularly to build plates such as used in additive manufacturing.

2. Description of Related Art

Additive manufacturing (AM) is widely used in manufacturing due among other things to the flexibility it allows in design. A typical AM process starts with a build plate, which is set in an AM machine. One type of AM machine deposits a powder of metallic material on the build plate in successive layers, and between each successive deposition of powder, fuses selective portions of the powder to the underlying layer using a laser. This process of layering powder and fusing portions of each layer of powder to underlying layers eventually builds a part. Since the part is initiated by fusing the first layer of powder to the build plate, at the end of the process, the part is still fused to the build plate.

Post processing can be performed to remove the part form the build plate and provide any further modifications to the part needed, much of which can be performed before removing the part from the build plate. It is often necessary to move the part and build plate from the AM machine to another machine such as a mill or the like. Build plates are heavy and awkward to handle, often weighing around 30-50 pounds (13.6-22.7 kg) after a build is complete. The rear of the plate (opposite the build) needs to be accessible for mounting on post processing equipment. Parts can be built close to the edge of the build plate, making material handling difficult or impossible while keeping the rear of the plate available for mounting. Often the handling of the plate is done manually, and the handler must use an awkward posture to reach far enough into the AM machine to reach the build plate for removal. Care must be therefore exercised to avoid damaging the build plate, the AM machine, the build itself, and to avoid undue strain on the handler.

Such conventional methods and systems have generally been considered satisfactory for their intended purpose. However, there is still a need in the art for improved build plates and handling. The present disclosure provides a solution for this need.

SUMMARY OF THE INVENTION

An additive manufacturing build plate system includes a plate body defining a build surface and a rear surface opposite the build surface. A peripheral surface extends between the rear surface and the build surface. At least one gripping feature is defined in the peripheral surface, extending inwardly into the plate body between the build surface and the rear surface.

The peripheral surface can define a plurality of corners of the plate body, wherein each corner of the plate body includes a respective gripping feature. The at least one gripping feature can include at least one of a slot, a channel, a bore, or a through hole.

A handling bracket can be removably engaged to the at least one gripping feature. The handling bracket can extend at least partially about the peripheral surface of the plate body. The handling bracket can include an interface configured for handling equipment to engage the handling bracket for handling of the plate body.

In embodiments, the handling bracket extends fully about the peripheral surface of the plate body. The handling bracket can include a main member and a latching member which latch together to surround the peripheral surface of the plate body.

In embodiments, the handling bracket extends about three complete sides of the plate body. The handling bracket can include at least one of a sliding mechanism or a hinging mechanism allowing the handling bracket to be removed from and attached to the plate body. The at least one gripping feature can include at least one slot defined in at least one respective corner of the plate body, and the handling bracket can include at least one inward extending mating feature respectively engaged with the at least one slot.

In embodiments, the handling bracket fully extends along only one side of the peripheral surface. The at least one gripping feature can include a pair of opposed bores, wherein the handling bracket includes a pair of pins, each pin engaged in a respective one of the opposed bores. Each bore can be defined as a through hole extending through a respective corner of the plate body from one side of the peripheral surface to another.

The system can include a handling bracket removably engaged to the at least one gripping feature and a lifting device engaged to the handling bracket for handling the plate body. The handling bracket can include an interface, wherein the lifting device is engaged with the interface of the handling bracket for handling of the plate body. The interface can include at least one bore or through hole defined in the bracket. The interface can include at least one thin section that is thinner than adjacent portions of the handling bracket. The handling device can include articulation for manipulation of the plate body in a plurality of axes of movement. The handling device can include a cart configured for movement of the plate body from one machine or station to another.

A method of handling a build plate includes engaging a handling bracket with a gripping feature defined in a peripheral surface of a plate body defining a build surface and a rear surface opposite the build surface, wherein the peripheral surface extends between the rear surface and the build surface and lifting the plate body with a lifting device engaged to the handling bracket.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
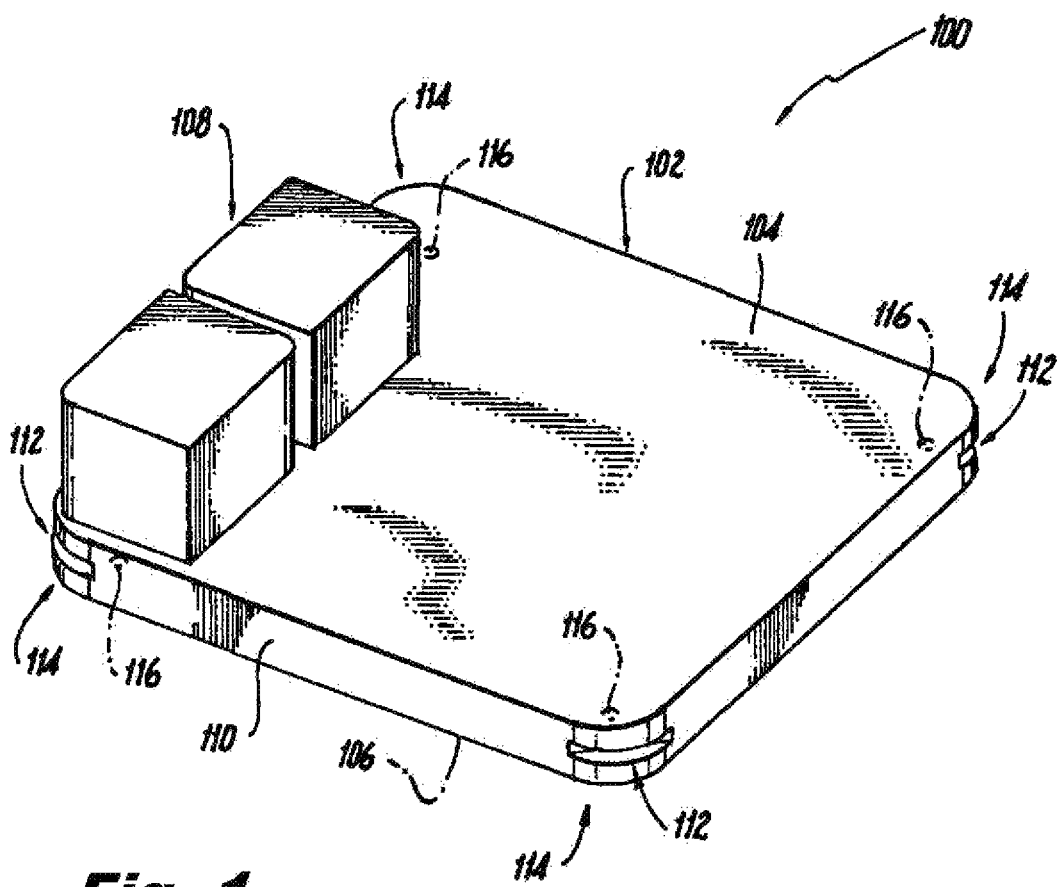
FIG. 1 is a perspective view of an exemplary embodiment of a build plate system constructed in accordance with the present disclosure, showing the plate body with gripping features defined at the corners.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-9, as will be described. The systems and methods described herein can be used for ease of handling additive manufacturing (AM) build plates.

Figure 2:
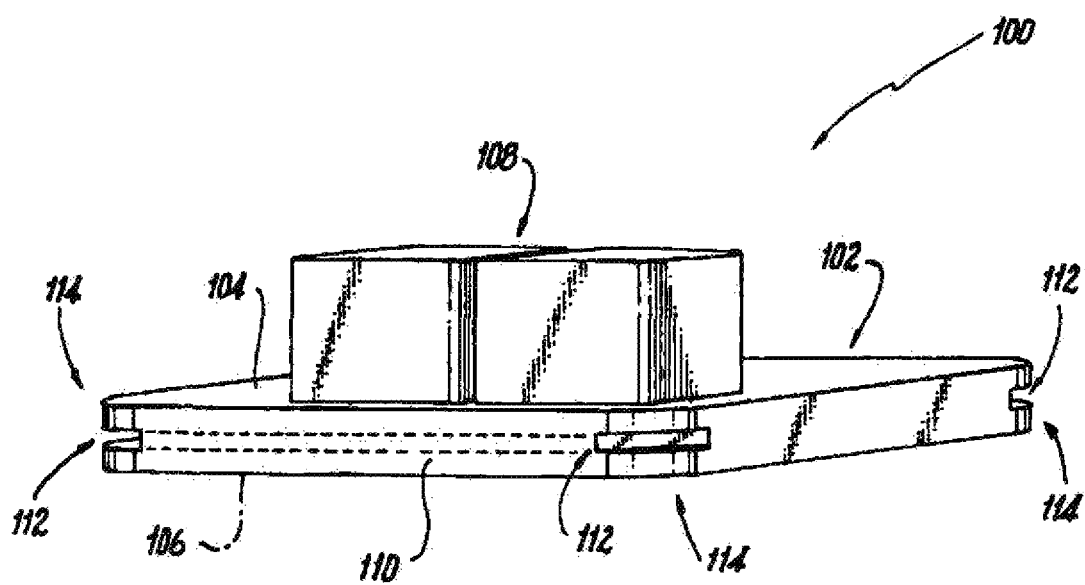
FIG. 2 is a perspective view of the system of FIG. 1, showing the fourth gripping feature that is not visible in FIG. 1.

AM build plate system 100 includes a plate body 102 defining a build surface 104 and a rear surface 106 opposite the build surface 104. In FIGS. 1 and 2, an arbitrary build 108 is shown fused to build surface 104 as after an AM build has been completed on plate body 102. A peripheral surface 110 extends about the plate body 102 and connects from the rear surface 106 to the build surface 104. A gripping feature 112 is defined in the peripheral surface 110 at each corner 114 of plate body 102 defined by peripheral surface 110. The gripping features 112 extending inwardly into the plate body 102 between the build surface 104 and the rear surface 106. In the example shown in FIGS. 1 and 2, the gripping features 112 are formed as slots inset from peripheral surface 110 at the corners 114 of plate body 102, however the gripping features can includes any other suitable type of inset feature such as slots, a channels extending along the straight edges of peripheral surface 110 (as indicated in broken lines in FIG. 2), bores defined inward from peripheral surface 110, or through holes defined through plate body 102 from one side of peripheral surface 110 to another.

There are features 116, e.g., bores, detents, or the like, on the rear surface 106 that engage equipment such as an AM machine, or other processing machines. Rear surface 106 must be kept free to make such engagements.

Figure 3:
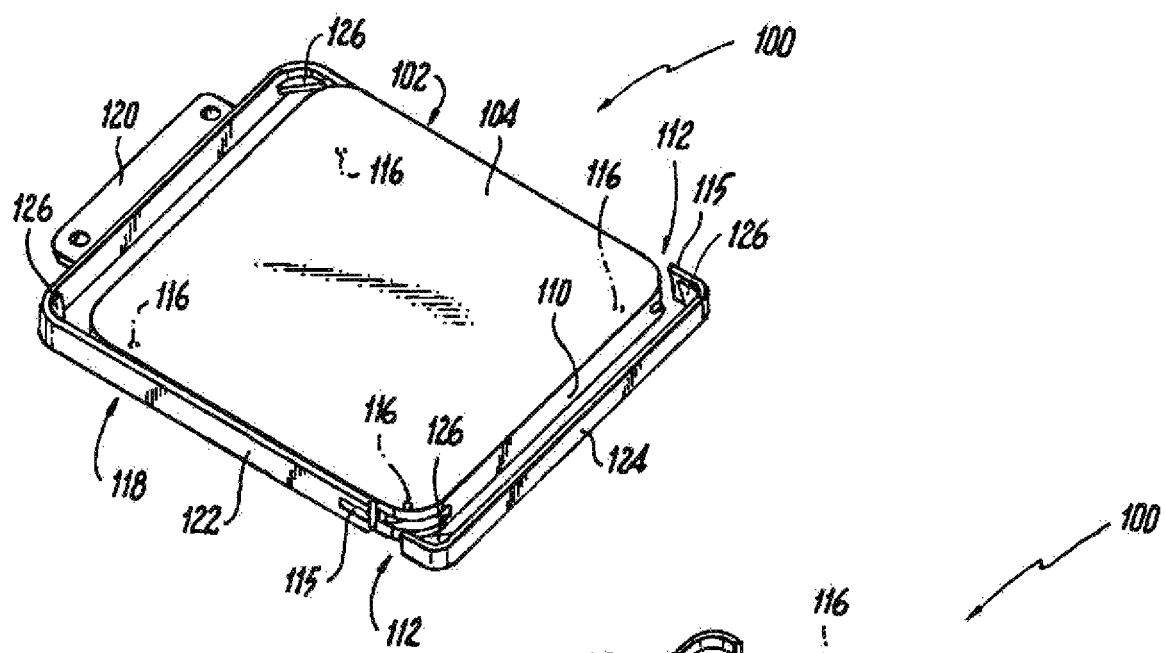
FIG. 3 is a perspective view of the plate body of FIG. 1, showing the plate body with a handling bracket that extends all the way around the peripheral surface of the plate body.

With reference now to FIG. 3, a handling bracket 118 is removably engaged to the gripping features 112. The handling bracket 118 extends about the peripheral surface 110 of the plate body 102. The handling bracket 118 includes an interface 120 configured for handling equipment to engage the handling bracket 118 for handling of the plate body 102, e.g., with an ergonomic lifting device such as a crane, hoist, lift, or the like, as will be described below with reference to FIGS. 8-9. The handling bracket 118 extends fully about the peripheral surface 110 of the plate body 102. The handling bracket 118 includes a main member 122 and a latching member 124 which latch together at latch points 115 to surround the peripheral surface 110 of the plate body 102. The handling bracket 118 includes a respective inward extending mating feature 126, e.g., in the form of a web extending from one edge to an adjacent edge at the corner of handling bracket 118. Each mating feature 118 is respectively engaged with the each respective gripping feature 112 for a positive mechanical hold, as opposed to a merely frictional hold. Bracket 118 leaves build surface 104 and rear surface 106 free for mounting or other needs.

Figure 4:
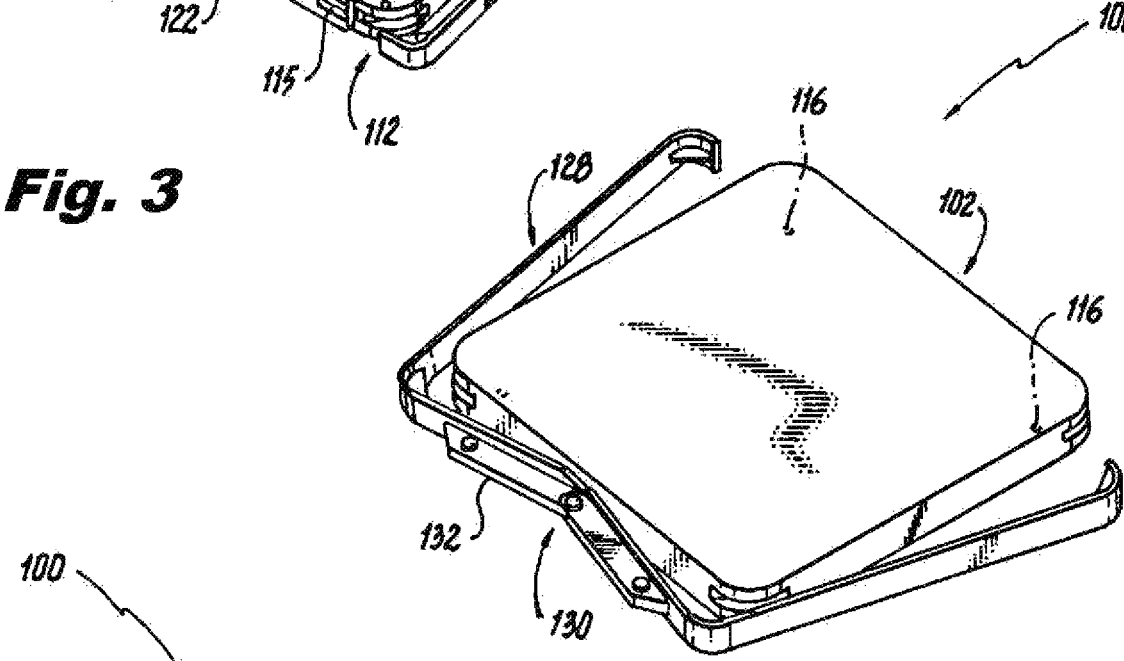
FIG. 4 is a perspective view of the plate body of FIG. 1, showing the plate body with a handling bracket that hinges.
Figure 5:
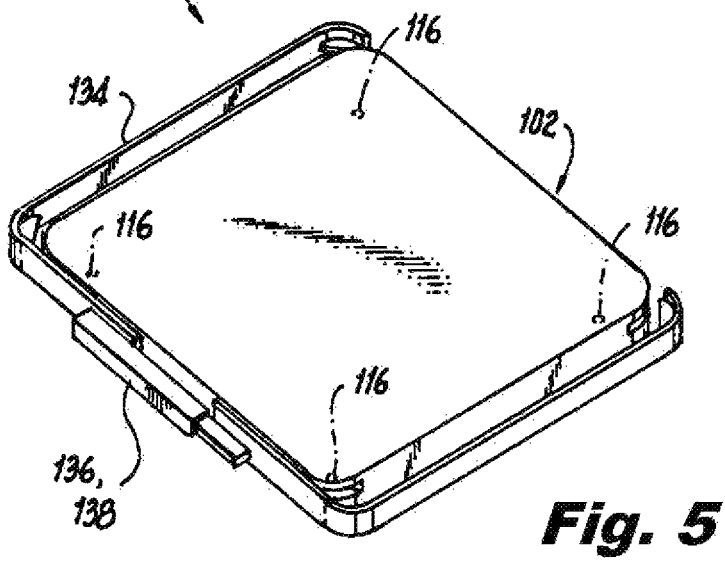
FIG. 5 is a perspective view of the plate body of FIG. 1, showing the plate body with a handling bracket that slides to engage and disengage the plate body.

With reference now to FIG. 4, in another exemplary embodiment, the handling bracket 128 only extends about three complete sides of the plate body 102. The handling bracket 128 includes or a hinging mechanism 130 built into its interface 132 allowing the handling bracket 128 to be removed from and attached to the plate body 102. As shown in FIG. 5, instead of a hinging mechanism, another exemplary embodiment of handling bracket 134 includes a sliding mechanism 136 incorporated in its interface 138. Handling brackets 128 and 134 include similar mating features to mating features 126 described above with reference to FIG. 3.

Figure 6:
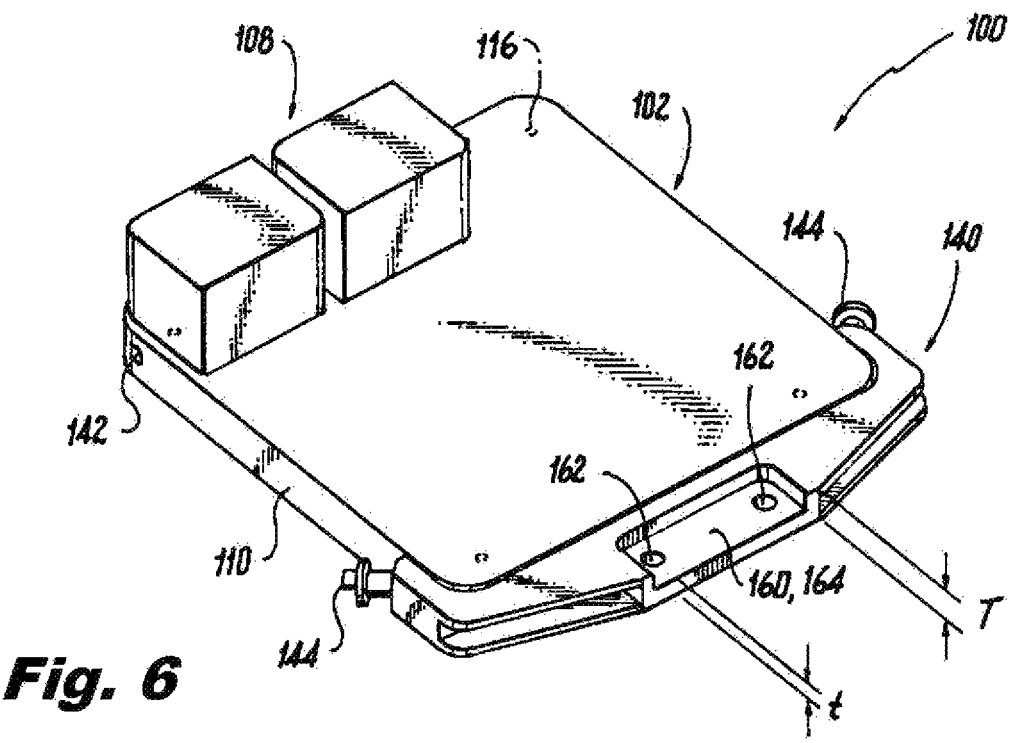
FIG. 6 is a perspective view of another exemplary embodiment of a plate body, showing a handling bracket that extends fully along only one edge of the peripheral surface of the plate body.
Figure 7:
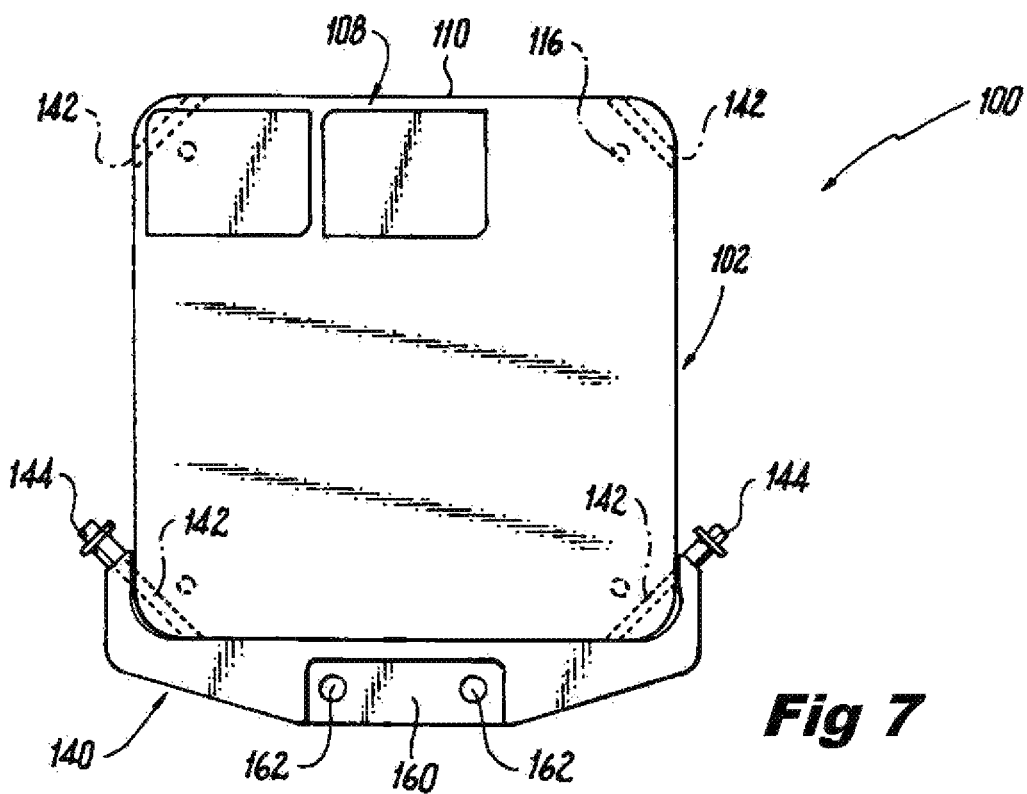
FIG. 7 is a plan view of the plate body and handling bracket of FIG. 6, showing the engagement of the pins of the handling bracket in the through holes of the plate body.

Referring now to FIG. 6, another exemplary embodiment of handling bracket 140 fully extends along only one side of the peripheral surface 110 to leave clearance around a majority of the perimeter of plate body 102. The gripping features can include a through hole 142 at each corner of plate body 102, as shown in FIG. 7, extending through a respective corner of the plate body from one side of the peripheral surface 110 to another. In lieu of through holes, a pair of opposed bores could be used that do not meet to form a full through hole. The handling bracket 140 includes a pair of pins 144, e.g., ball detent pins. Each pin 144 is engaged in a respective one of the opposed bores or through holes 144.

Figure 8:
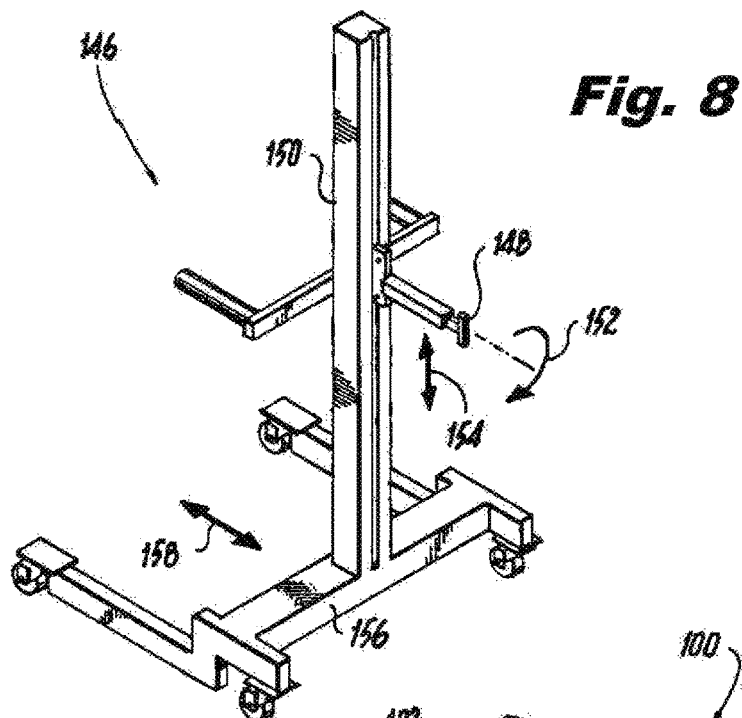
FIG. 8 is a perspective view of an exemplary embodiment of a lifting device, schematically showing degrees of freedom for motion of the lifting device.
Figure 9:
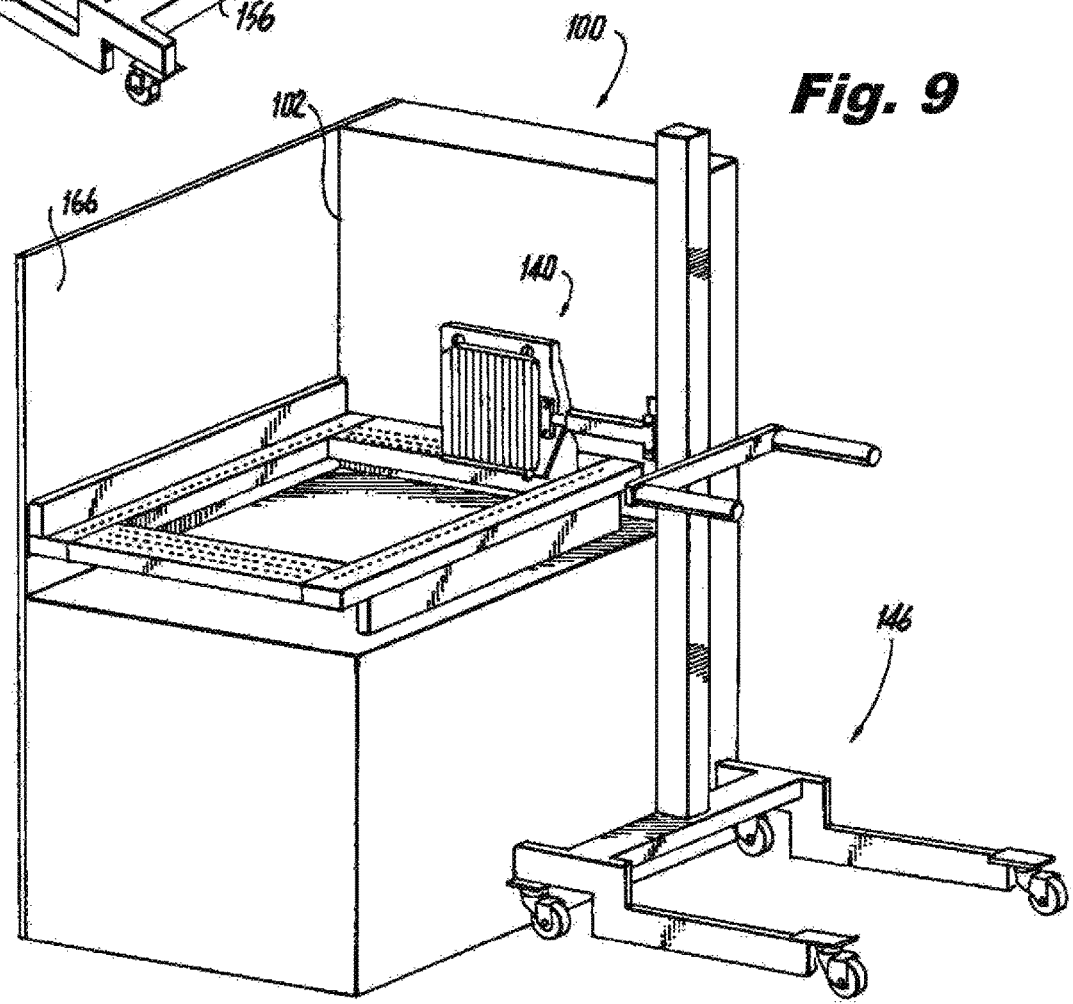
FIG. 9 is a perspective view of a the lifting device of FIG. 8, showing the lifting device handling a build plate.

With reference now to FIG. 8, the system 100 can include a lifting device 146 engaged to the handling bracket for handling the plate body. The handling device 146 includes a gripper 148 operatively connected to a lifting body 150 with articulation for manipulation of the plate body 102 in a plurality of controlled axes of movement, as indicated by the double arrows 152 and 154 in FIG. 8. The handling device 148 includes a cart 156 connected to lifting body 150 configured for movement of the plate body 102, e.g. lifting the plate body 102 and moving it from one machine or station to another as indicated by double arrow 158.

The handling brackets described above each include an interface, e.g., interfaces 120, 132, 138, and 160. The gripper 148 of the lifting device 146 can engage the interface of the handling bracket, e.g., handling brackets 118, 128, 134, and 140 for handling of the plate body 102. A indicated in FIG. 6, the interface, e.g., interface 140, can include at least one bore or through hole 162 defined in the bracket in a thin section 164 of the handling bracket 140, e.g., thin section 164 has a thickness t that is thinner than the thickness T of the adjacent portions of handling bracket 140. Gripper 152 engaged through holes 162 and thin section 164 to grasp handling bracket 140, which in turn securely holds plate body 102 for manipulation of plate body 102, e.g. into and out of AM machine 166 or other stations or machines.

The methods and systems of the present disclosure, as described above and shown in the drawings, provide for AM build plates with superior properties including the potential advantages of ease of handling including removal and placement of build plates into and out of process machines or stations, reduction of stress and strain of handlers, ability to change orientation of build plates with reduced chance of part damage, and increased handling precision because of mechanical handling of the load. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An additive manufacturing build plate system comprising:
    a plate body defining a build surface, a rear surface opposite the build surface, and a peripheral surface that extends between the rear surface and the build surface;
    at least one gripping feature defined in the peripheral surface, extending inwardly into the plate body between the build surface and the rear surface; and
    a handling bracket removably engagable to the at least one gripping feature, wherein the handling bracket fully extends along only one side of the peripheral surface.

2. A system as recited in claim 1, wherein the at least one gripping feature includes a pair of opposed bores, wherein the handling bracket includes a pair of pins, each pin engaged in a respective one of the opposed bores.

3. A system as recited in claim 2, wherein each bore is defined as a through hole extending through a respective corner of the plate body from one side of the peripheral surface to another.

* * * * *